United States Patent
Hall et al.

(10) Patent No.: US 7,609,749 B1
(45) Date of Patent: Oct. 27, 2009

(54) METHOD AND APPARATUS FOR GENERATING NON-RECURSIVE VARIABLE RATE ORTHOGONAL SPREADING CODES

(75) Inventors: Eric K. Hall, Salt Lake City, UT (US); Thomas R. Giallorenzi, Sandy, UT (US); Richard B. Ertel, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 12/080,131

(22) Filed: Mar. 31, 2008

Related U.S. Application Data

(63) Continuation-in-part of application No. 10/622,895, filed on Jul. 17, 2003, now abandoned.

(51) Int. Cl.
*H04B 1/00* (2006.01)

(52) U.S. Cl. .................. 375/141; 375/130; 370/208; 370/320; 370/342; 370/355

(58) Field of Classification Search ............. 375/141, 375/130; 370/320, 208, 342, 335
See application file for complete search history.

(56) References Cited

U.S. PATENT DOCUMENTS

| | | | | |
|---|---|---|---|---|
| 5,571,761 | A | 11/1996 | Kumagai et al. | 501/134 |
| 6,091,760 | A | 7/2000 | Giallorenzi et al. | 375/140 |
| 6,163,524 | A | 12/2000 | Magnusson et al. | 370/208 |
| 6,965,582 | B1 | 11/2005 | Moulsley | 370/329 |
| 2001/0043644 | A1 | 11/2001 | Dooley et al. | 375/150 |
| 2002/0006156 | A1 * | 1/2002 | Belaiche | 375/130 |

OTHER PUBLICATIONS

Hubner, H., "On The Transmission of Walsh Modulated Multiplex Signals", Research Institute of the Telecommunication Engineering Centre of the Deutsche Bundespost, Dermstadt, Western Germany, pp. 41-45, 1970 Proceeding.

Davidson, I.A., "The Use of Walsh Functions For Multiplexing Signals", Research and Development Laboratories Northern Electric Company Ltd., Ottawa, Canada, pp. 23-25, 1970 Proceedings.

* cited by examiner

*Primary Examiner*—Mohammad H Ghayour
*Assistant Examiner*—Leila Malek
(74) *Attorney, Agent, or Firm*—Harrington & Smith, PC

(57) ABSTRACT

A method for constructing and selecting non-recursive orthogonal variable spreading factor (OVSF) codes is provided. The method includes: defining a variable $B=SF_{max}/SF_{min}$, where $SF_{max}$ is a maximum desired spreading factor and $SF_{min}$ is a minimum desired spreading factor; forming B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix; forming a modulation matrix M of dimension B×B such that $MM^T = BI_B$, where $I_B$ is a B×B identity matrix; forming an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \cdots & M_{1,B} \cdot G_B \\ M_{2,1} \cdot G_1 & M_{2,2} \cdot G_2 & \cdots & M_{2,B} \cdot G_B \\ \vdots & \vdots & \ddots & \vdots \\ M_{B,1} \cdot G_1 & M_{B,2} \cdot G_2 & \cdots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$; selecting a row of the OVSF code matrix C' to use as a pseudo-noise (PN) code; and one of spreading or despreading a signal using the selected PN code.

14 Claims, 2 Drawing Sheets

METHOD AND APPARATUS FOR GENERATING NON-RECURSIVE VARIABLE RATE ORTHOGONAL SPREADING CODES

CROSS-REFERENCE TO RELATED APPLICATIONS

This patent application is a continuation-in-part of U.S. patent application Ser. No. 10/622,895, filed Jul. 17, 2003 now abandoned, the disclosure of which is incorporated by reference herein in its entirety.

TECHNICAL FIELD

The exemplary and non-limiting embodiments of this invention relate generally to communication systems, apparatus, methods and computer program products and, more specifically, relate to non-recursively generating variable rate orthogonal spreading codes, for example, that are optimized for a multi-user, multi-rate environment.

BACKGROUND

The following abbreviations are utilized herein:

3G third generation (of mobile networks)

CDMA code division multiple access

DS-CDMA direct sequence code division multiple access

FDD frequency division duplex

FL forward link (RBU to SU)

FWS fixed wireless system

OVSF orthogonal variable spreading factor

PN pseudo-noise

RBU radio base unit

RF radio frequency

RL reverse link (SU to RBU)

S-CDMA synchronous code division multiple access

SF spread factor

SU subscriber unit

UMTS universal mobile telecommunications system

WCDMA wideband code division multiple access

In the forward direction of a CDMA system, i.e., from a base station or base unit to a fixed or mobile subscriber unit, it is relatively easy to synchronize the PN codes of the various channels since they are all created at and transmitted from the same base station. It is furthermore relatively easy to time-align the chips and symbols of the constituent signals within the aggregate waveform. As a result, the forward channel of most CDMA systems utilizes some form of synchronous CDMA. In some systems, such as a fixed wireless local loop telephone system known as Primewave 2000™, available from the assignee of this patent application, the reverse channel (i.e., subscriber unit to base station) is also quasi-synchronous. In this type of system, a timing control loop is utilized to maintain time-alignment amongst the various users in the system such that their respective signals arrive at the base station within a small fraction of a chip of each other. For mobile cellular applications, synchronous CDMA is limited to the forward link (base station to mobile user) with asynchronous CDMA used in the reverse link. WCDMA and CDMA2000 3G wireless cellular standards both employ synchronous, multi-rate CDMA in the forward link.

Whenever synchronous or quasi-synchronous CDMA is employed, it becomes possible to use PN codes that are designed to have the smallest possible cross-correlation when time-aligned with each other. If the number of users in the system is less than or equal to the number of chips transmitted for each channel symbol (which may be referred to as the channel spreading factor), then it is possible to design PN codes that are truly orthogonal to each other. When the number of users exceeds the channel symbol processing gain, then it is no longer possible to design codes that are orthogonal since the dimensionality of the signaling space has been exceeded. For this reason, it is possible for synchronous and quasi-synchronous CDMA systems to support a number of users equal to the channel symbol processing gain, as long as the links have adequately large power and adequately low interference resulting from signal distortions such as clipping, multi-path, filtering and timing offsets.

It is often desirable for the system to support users that are not all at the same signaling rate. For example, in a system where some users are using a telephone and the required data rate is on the order of a few thousand bits per second (Kbps) to a few tens of Kbps, while other users are using the system as a computer network interface and require a data rate on the order of millions of bits per second (Mbps) or more, the waveform should to be able to simultaneously accommodate the various non-homogeneous users.

It is possible to support a high rate user by allocating to him or her a plurality of parallel, lower rate channels, but this approach requires that the high rate users have a plurality of transmitters and receivers. As such, this approach is generally not desirable in many systems where cost is an important consideration.

A more cost-effective technique to simultaneously support high rate and low rate users is to employ a common chipping rate for all users, but to permit the users in the system to vary their channel symbol spreading factor depending on their respective data rate. This implies that if one desires that all users in either the forward, or the forward and reverse channels, be orthogonal to each other, independent of their rates, then a set of PN codes are needed of various lengths that are mutually orthogonal when synchronized appropriately. A spreading code set allowing variable spread factor/multi-rate operation is called an OVSF code set. Such code sets are employed in fixed wireless CDMA systems as well as 3G wireless CDMA cellular networks, including UMTS/WCDMA. For example, the UMTS FDD channelization codes are OVSF codes.

Walsh functions are a set of binary and orthogonal waveforms that can be used for signal multiplexing purposes, and have long been recognized as having application to telephony. Reference in this regard may be made to an article entitled "The Multiplexing of Telephone Signals by Walsh Functions", by I. A. Davidson in Applications of Walsh Functions, 1971 proceedings, Second Edition, Eds. R. W. Zeek and A. E. Showalter, pages 177-179.

Of the number of possible sets of orthogonal functions that can be used as carriers in multiplex transmission, the category of completely orthogonal Hadamard functions has also been long recognized as being particularly well-suited for technical applications, including telephony applications. In general, Walsh functions are special Hadamard functions, and can be described by Hadamard matrices with powers of 2 as ordinary numbers. Further function systems can be derived from Hadamard matrices by permutation of columns and rows and by sign inversion, while preserving their orthogonal characteristics.

One method for creating PN codes that are mutually orthogonal is to use a recursive construction technique defined by H. Hubner, "Multiplex Systems Using Sums of Walsh Functions as Carriers", also in Applications of Walsh Functions, 1971 proceedings, Second Edition, pages 180-191.

Reference in this regard also may be made to U.S. Pat. No. 5,751,761, entitled "System and Method for Orthogonal Spread Spectrum Sequence Generation in Variable Data Rate Systems", by Klein S. Gilhousen.

In general, the approach used by Gilhousen is a recursive approach, wherein the value of the n-th output of y is created from a previous value of y, so long as n>0. In other words, past relationships are used to create new, current relationships between code elements resulting in a tree like code structure, as shown in Gilhousen.

However, there are several problems with the approach described by Gilhousen. First, if the Walsh codes were used directly then the spectral properties of the PN codes would be very poor. This is due to the fact that the codes are made up of very regular patterns. Some codes are completely un-spread, while others are spread with square waves whose frequencies are one, two, four, eight, etc. times the symbol rate. These users would have very limited immunity to jammers, and would not gain the benefits of being spread with a PN code of processing gain n or 2n (depending on their rate).

In U.S. Pat. No. 5,751,761, the approach used to avoid this problem is to apply a cover code to the code matrix. This amounts to multiplying every code in the set by a single randomizing vector of ±1-valued chips whose length is much larger than the channel symbol processing gain. So long as every code in the set is multiplied by the same cover code, the orthogonality of the set is retained, but the resulting set is made to appear more random.

However, a problem that arises when applying a cover code to the matrix is that the resulting randomized Walsh codes are not uniform. This means that, over any symbol or spreading period, the number of +1 valued chips and −1 valued chips are not equal to one another in most of the resulting PN codes. Balance in the code set is a very desirable property since it implies that the codes are orthogonal to any DC offset in the receiver of the signal. In other words, if the chips are ±1 millivolts in the receiver, but there is a 2 millivolt DC offset in the signal at the input of the despreader, then the despreader would have to multiply the ±1 despreading code with an input signal having values of +3 and +1 millivolts. However, if the PN code is over a symbol, then the DC offset will not affect the despreading process.

Another problem associated with using code sets that are recursively generated is that code sets so generated are not orthogonal if linearly related. In addition, even code sets that are not linearly related but are derived from the same node are orthogonal but only over some predetermined time period. In other words, the instantaneous cross-correlation between code sets of the same branch may be relatively high, which results in interference between users. It will further be appreciated by those skilled in the art that the closer the code sets are to the root node the higher the instantaneous cross-correlation.

As has been made apparent, the use of recursive techniques to create PN code sets can result in non-orthogonal codes and/or orthogonal codes that exhibit high instantaneous cross-correlation.

SUMMARY

In one non-limiting, exemplary embodiment, and as shown in FIG. 2, a method comprising: defining a variable $B=SF_{max}/SF_{min}$, where $SF_{max}$ is a maximum desired spreading factor and $SF_{min}$ is a minimum desired spreading factor; forming B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix; forming a modulation matrix M of dimension B×B such that $MM^T = BI_B$, where $I_B$ is a B×B identity matrix; forming an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$; selecting a row of the OVSF code matrix C' to use as a pseudo-noise (PN) code; and one of spreading or despreading a signal using the selected PN code.

In another non-limiting, exemplary embodiment, an apparatus comprising: at least one processor configured to define a variable $B=SF_{max}/SF_{min}$, where $SF_{max}$ is a maximum desired spreading factor and $SF_{min}$ is a minimum desired spreading factor; to form B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix; to form a modulation matrix M of dimension B×B such that $MM^T = BI_B$ where $I_B$ is a B×B identity matrix; to form an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$; and to select a row of the OVSF code matrix C' to use as a pseudo-noise (PN) code; and a transceiver configured to transmit or receive a signal using the selected PN code.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
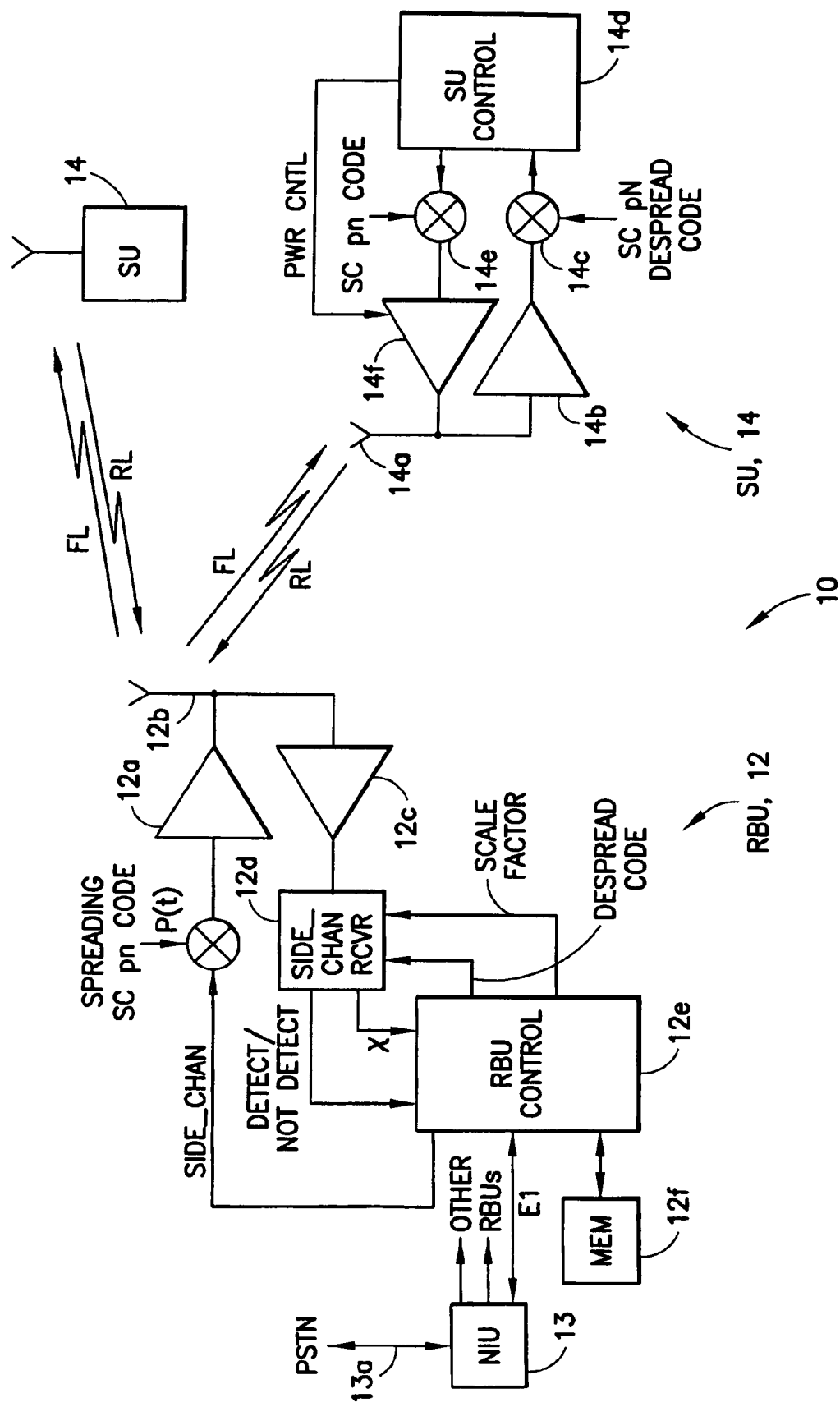
FIG. 1 is a block diagram of an exemplary communications system implementing features of the exemplary embodiments of the invention.

Referring to FIG. 1, there is shown a pictorial diagram of an exemplary multi-user telecommunications system incorporating features of the exemplary embodiments of the invention. While discussed below with reference to the exemplary system shown in FIG. 1, it should be appreciated that the exemplary embodiments of the invention may be utilized in conjunction with other systems and arrangements (e.g., of the various components).

In FIG. 1 there is shown a FWS 10 that is suitable for practicing exemplary embodiments of this invention. Specifically, the FWS 10 employs direct sequence spread spectrum based CDMA techniques over an air link to provide local access to subscribers, and offers very high quality, highly reliable service. The FWS 10 is a S-CDMA communications system wherein FL transmissions from a base station, referred to also as a RBU 12, with a plurality of transceiver units, referred to herein as users or SUs 14, are symbol and chip aligned in time. The SUs 14 operate to receive the FL transmissions from the RBU 12 and to synchronize to one of the transmissions. Each SU 14 also transmits a signal on a RL to RBU 12 in order to synchronize the timing of its transmissions to the RBU 12, and to generally perform bi-directional communications. The FWS 10 is suitable for use in implementing a telecommunications system that conveys multi-rate voice and/or data between the RBU 12 and the SUs 14.

The RBU 12 includes circuitry for generating a plurality of user signals ($USER_1$ to $USER_n$, not shown in FIG. 1) and a synchronous side channel signal ($SIDE_{chan}$, not shown in FIG. 1) that is substantially continuously transmitted. Each of these signals is assigned a respective PN spreading code and is modulated therewith before being applied to a transmitter 12a for transmission via an antenna 12b. When transmitted on the FL, the transmissions are modulated in phase quadrature and the SUs 14 are assumed to include suitable phase demodulators for deriving in-phase (I) and quadrature (Q) components therefrom. The RBU 12 is capable of transmitting a plurality of frequency channels. As a non-limiting example, each frequency channel may include up to 128 code channels and have a center frequency in the range of 2 GHz to 4 GHz.

The RBU 12 also includes a receiver 12c having an output coupled to an input of a side channel receiver 12d. The side channel receiver 12d receives as inputs the spread signal from the receiver 12c, a scale factor signal, and a side channel despread PN code. These latter two signals are sourced from a RBU processor or controller 12e. The scale factor signal can be fixed, or can be made adaptive as a function of the number of SUs 14 that are transmitting on the reverse channel, as non-limiting examples. The side channel receiver 12d outputs a detect/not detect signal to the RBU controller 12e indicating a detection (or non-detection) of a transmission from one of the SUs 14, and also outputs a power estimate value. A read/write memory (MEM) 12f is bi-directionally coupled to the RBU controller 12e for storing system parameters and other information, such as SU timing phase information and power estimate values.

A Network Interface Unit (NIU) 13 connects the RBU 12 to the public network, such as a public switched telephone network (PSTN) 13a as a non-limiting example, through analog or digital trunks that are suitable for use with the local public network. In this example, the RBU 12 connects to the NIU 13 using E1 trunks and to its master antenna 12b using a coaxial cable. The SU 14 communicates with the RBU 12 via the radio interface, as described above.

In the exemplary embodiment illustrated in FIG. 1, the SU-RBU air link provides a separate 2.72 MHz (3.5 MHz including guard bands) channel in each direction separated by 91 MHz, 100 MHz, or 119 MHz of bandwidth. The nominal spectrum of operation is 2.1-2.3 GHz, 2.5-2.7 GHz, 3.4-3.6 GHz, or 3.5-3.7 GHz. However, the system is adaptable such that the frequency can be varied as required. As will be made evident below, it is not necessary for the RBUs 12 to be synchronized to one another when employing OVSF code sets in accordance with exemplary embodiments of the invention.

An OVSF code set can be described by a matrix M having dimension $SF_{max} \times SF_{max}$, where $SF_{max}$ is the maximum desired spreading factor (e.g., measured in chips/symbol) and a spreading code is a row of the matrix M. Changing the number of chips per symbol (e.g., the spreading factor) varies the information symbol rate of the CDMA channel. For example, a chipping rate of 3.84 Mcps could support an information symbol rate of 30 ksps with a spreading factor of 128 chips/symbol and an information symbol rate of 60 ksps with a spreading factor of 64 chips/symbol. With a fixed chipping rate, varying the spreading factor does not change the RF bandwidth of the transmitted DS-CDMA waveform, only the capacity measured in information bits or symbols per second.

When properly assigned, OVSF codes have the property that all users, regardless of the data modulation and spreading factor (and CDMA channel rate), are preferably orthogonal or nearly orthogonal such that the cross-correlation between codes is acceptable.

In accordance with one exemplary embodiment of the invention, a non-recursive method for constructing OVSF PN code sets (e.g., for use in a CDMA communication system) is provided. For the design of an OVSF having a maximum spreading factor, $SF_{max}$ and a minimum spreading factor $SF_{min}$, the method is as follows:

1. Define the variable $B=SF_{max}/SF_{min}$, where $SF_{max}$ is the maximum desired spreading factor (e.g., measured in chips per modulated symbol) and $SF_{min}$ is the minimum desired spreading factor. In some exemplary embodiments, B, $SF_{max}$ and $SF_{min}$ are powers of 2 (e.g., $SF_{max}=256$, $SF_{min}=16$ and $B=16$).

2. Form B unique "base matrices" ($G_i$, i=1, 2, ... B) of dimension $SF_{min} \times SF_{min}$, where $G_i G_i^T = SF_{min} I_{min}$ $\forall i$. Here, T denotes a matrix transpose and $I_{min}$ is an $SF_{min} \times SF_{min}$ identity matrix.

3. Form one "modulation matrix" (M) of dimension B×B such that $MM^T = BI_B$, where $I_B$ is a B×B identity matrix.

4. Form an $SF_{max} \times SF_{max}$ OVSF code matrix C' as:

$$C' = \begin{bmatrix} M_{1,1} \cdot G_1 & M_{1,2} \cdot G_2 & \dots & M_{1,B} \cdot G_B \\ M_{2,1} \cdot G_1 & M_{2,2} \cdot G_2 & \dots & M_{2,B} \cdot G_B \\ \vdots & \vdots & \ddots & \vdots \\ M_{B,1} \cdot G_1 & M_{B,2} \cdot G_2 & \dots & M_{B,B} \cdot G_B \end{bmatrix}$$

Here, $M_{i,j}$ is a scalar from the i-th row and j-th column of the matrix M, $G_k$ is a $SF_{min} \times SF_{min}$ base code matrix and $M_{i,j} \cdot G_k$ denotes the multiplication of the elements of $G_k$ by the scalar $M_{i,j}$.

5. (optional) Perform constrained column-wise permutations of C' using the method taught in commonly-assigned U.S. Pat. No. 6,091,760 to Giallorenzi et al. ("Non-Recursively Generated Orthogonal PN Codes For Variable Rate CDMA"), with the final OVSF code matrix C formed as:

$$C=\Pi(C')$$

Here, the function $\Pi(\ )$ represents a constrained, column-wise matrix permutation. From Giallorenzi et al., the constraint on the matrix permutation is designed to preserve the OVSF properties of the permuted matrix.

It should also be noted that the Hadamard construction may be considered a special case of this approach, where $C=H_{SFmax \times SFMax}$, $M=H_{B \times B}$, $G_k=H_{SFmin \times SFmin}$ for all k. In Giallorenzi et al., the matrix C' was chosen to be the Hadamard matrix ($C'=H_{SFmax \times SFMax}$) and the OVSF code sets are derived on constrained column-wise permutation. In this new construction based on the exemplary embodiments of this invention, the intermediate matrix, C', is extended to be a more general family of OVSF code matrices constructed using a modulation matrix and a set of base code matrices. As such, it is easily seen that this more general construction allows for an increase in OVSF code designs over the approach in Giallorenzi et al. Even for small spreading factors, the new approach allows for tens to hundreds of additional OVSF code sets above the approach proposed in Giallorenzi et al. The additional code sets available from this extension are easily seen in the multiplicity of the C' matrices. One advantage of having many different OVSF code sets in a multi-cell/multi-sector system (e.g., a CDMA system) is that multi-user interference is reduced (same-code users in adjacent cells/sectors can more readily be avoided).

As an example, consider the design of a code having $SF_{max}=8$ and $SF_{min}=2$. This gives B=4 and forms the following matrices as examples:

2×2 Base Matrices:

$$G_1 = \begin{bmatrix} 1 & 1 \\ 1 & -1 \end{bmatrix} G_2 = \begin{bmatrix} -1 & -1 \\ 1 & -1 \end{bmatrix} G_3 = \begin{bmatrix} 1 & 1 \\ -1 & 1 \end{bmatrix} G_4 = \begin{bmatrix} -1 & -1 \\ -1 & 1 \end{bmatrix}$$

4×4 Modulation Matrix:

$$M = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

8×8 Unpermuted OVSF Code Matrix:

$$C' = \begin{bmatrix} +1 \cdot \begin{bmatrix} 1 & 1 \\ 1 & -1 \end{bmatrix} & +1 \cdot \begin{bmatrix} -1 & -1 \\ 1 & -1 \end{bmatrix} & +1 \cdot \begin{bmatrix} 1 & 1 \\ -1 & 1 \end{bmatrix} & +1 \cdot \begin{bmatrix} -1 & -1 \\ -1 & 1 \end{bmatrix} \\ +1 \cdot \begin{bmatrix} 1 & 1 \\ 1 & -1 \end{bmatrix} & -1 \cdot \begin{bmatrix} -1 & -1 \\ 1 & -1 \end{bmatrix} & +1 \cdot \begin{bmatrix} 1 & 1 \\ -1 & 1 \end{bmatrix} & -1 \cdot \begin{bmatrix} -1 & -1 \\ -1 & 1 \end{bmatrix} \\ +1 \cdot \begin{bmatrix} 1 & 1 \\ 1 & -1 \end{bmatrix} & +1 \cdot \begin{bmatrix} -1 & -1 \\ 1 & -1 \end{bmatrix} & -1 \cdot \begin{bmatrix} 1 & 1 \\ -1 & 1 \end{bmatrix} & -1 \cdot \begin{bmatrix} -1 & -1 \\ -1 & 1 \end{bmatrix} \\ +1 \cdot \begin{bmatrix} 1 & 1 \\ 1 & -1 \end{bmatrix} & -1 \cdot \begin{bmatrix} -1 & -1 \\ 1 & -1 \end{bmatrix} & -1 \cdot \begin{bmatrix} 1 & 1 \\ -1 & 1 \end{bmatrix} & +1 \cdot \begin{bmatrix} -1 & -1 \\ -1 & 1 \end{bmatrix} \end{bmatrix}$$

$$C' = \begin{bmatrix} 1 & 1 & -1 & -1 & 1 & 1 & -1 & -1 \\ 1 & -1 & 1 & -1 & -1 & 1 & -1 & 1 \\ 1 & 1 & 1 & 1 & 1 & 1 & 1 & 1 \\ 1 & -1 & -1 & 1 & -1 & 1 & 1 & -1 \\ 1 & 1 & -1 & -1 & -1 & -1 & 1 & 1 \\ 1 & -1 & 1 & -1 & 1 & -1 & 1 & -1 \\ 1 & 1 & 1 & 1 & -1 & -1 & -1 & -1 \\ 1 & -1 & -1 & 1 & 1 & -1 & -1 & 1 \end{bmatrix}$$

From the matrix C', the techniques of Giallorenzi et al. can be used to design additional code sets.

Below is shown pseudo code for implementing the exemplary embodiment described immediately above:

% Matlab Code to implement above example

G1=[1 1; 1 -1];

G2=[-1 -1; 1 -1];

G3=[1 1; -1 1];

G4=[-1 -1; -1 1];

M=hadamard(4);

$$Cp = \begin{bmatrix} M(1,1)^*G1 & M(1,2)^*G2 & M(1,3)^*G3 & M(1,4)^*G4; \\ M(2,1)^*G1 & M(2,2)^*G2 & M(2,3)^*G3 & M(2,4)^*G4; \\ M(3,1)^*G1 & M(3,2)^*G2 & M(3,3)^*G3 & M(3,4)^*G4; \\ M(4,1)^*G1 & M(4,2)^*G2 & M(4,3)^*G3 & M(4,4)^*G4]; \end{bmatrix}$$

Based on the foregoing, in one aspect, exemplary embodiments of this invention provide a non-recursive technique for constructing a series of mutually orthogonal sets of PN codes that support multi-rate signaling, where each of the sets of PN codes is selected for a predetermined time duration, such as an integer multiple of a user symbol time, for example. The sets of PN codes have the desirable properties that the constituent codes are at all of the desired symbol rates, and furthermore the constituent codes exhibit desirable spectral properties.

Another aspect of the exemplary embodiments of this invention provides an improved technique for providing PN code structures for use in a communications system (e.g., a CDMA system) having a plurality of users simultaneously operating at different data rates or single data rates.

A further aspect of exemplary embodiments of this invention provides a non-recursive technique for constructing a series of PN code sets that can be used to advantage in multi-rate synchronous and quasi-synchronous systems (e.g., CDMA systems), wherein the technique employs a permuted orthogonal matrix to modulate permuted orthogonal matrices to create multiple PN code sets that support multi-rate operation, where the multiple PN code sets may be selected for a predetermined time duration such as a user symbol time, for example.

Figure 2:
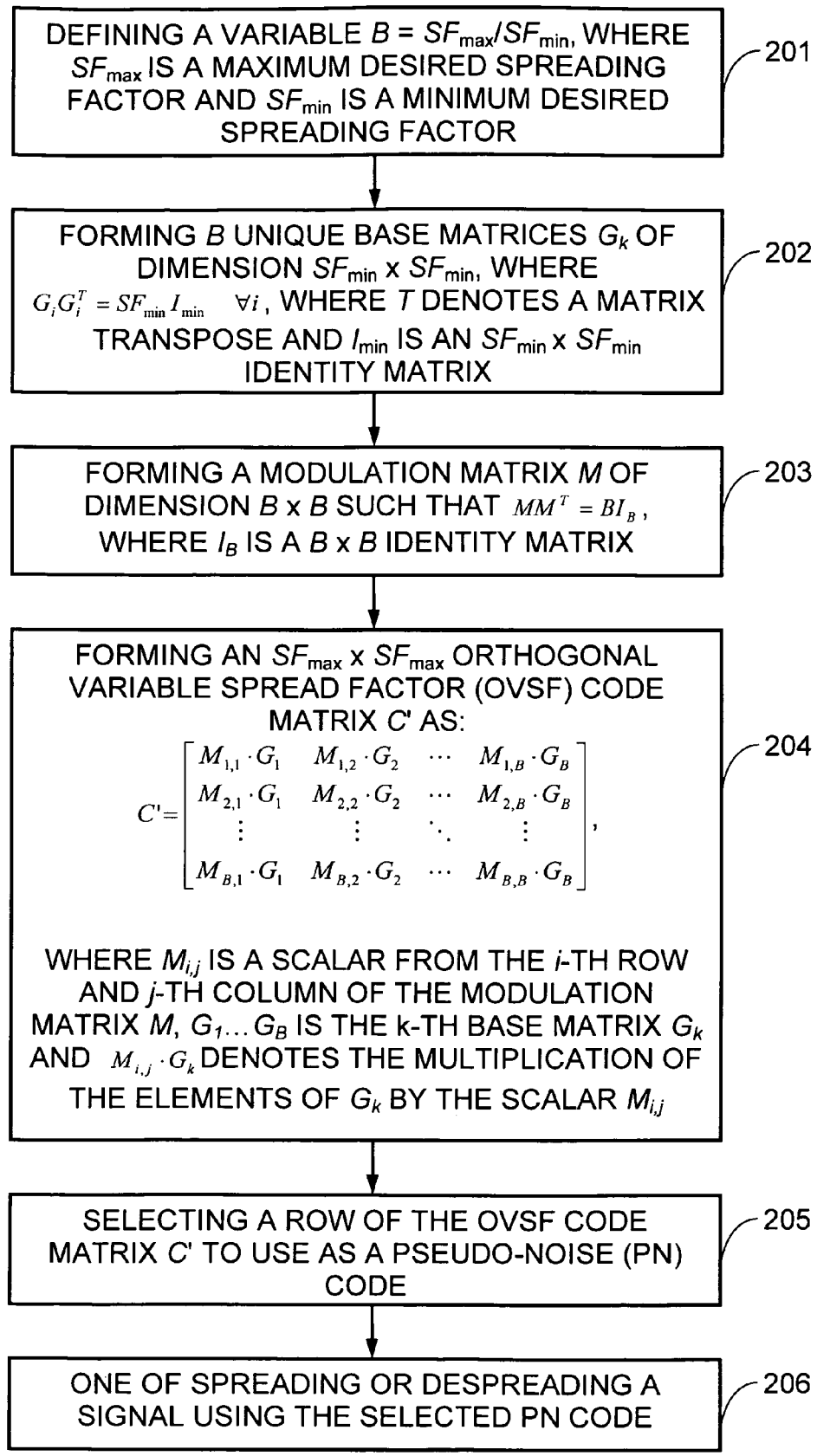
FIG. 2 is a flow chart depicting an exemplary method for implementing features of the exemplary embodiments of the invention.

In one non-limiting, exemplary embodiment, and as shown in FIG. 2, a method comprising: defining a variable $B=SF_{max}/SF_{min}$, where $SF_{max}$ is a maximum desired spreading factor and $SF_{min}$ is a minimum desired spreading factor (201); forming B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix (202); forming a modulation matrix M of dimension B×B such that $MM^T = BI_B$, where $I_B$ is a B×B identity matrix (203); forming an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$ (204); selecting a row of the OVSF code matrix C' to use as a pseudo-noise (PN) code (205); and one of spreading or despreading a signal using the selected PN code (206).

A method as above, where $SF_{max}$ and $SF_{min}$ are measured in chips per modulated symbol. A method as in any above, further comprising: performing at least one constrained column-wise permutation on the OVSF code matrix C' prior to selection of the row, where the constraint on the at least one constrained column-wise permutation is designed to preserve OVSF properties of the permuted code matrix C'. A method as in any above, where the B unique base matrices $G_k$ comprise Hadamard matrices. A method as in any above, where the method is implemented within a multi-rate code division multiple access (CDMA) wireless communication system. A method as in any above, wherein the multi-rate CDMA wireless communication system comprises at least one fixed subscriber unit or at least one mobile subscriber unit. A method as in any above, wherein the method is implemented by a computer program. A method as in any above, wherein the method is implemented by a program storage device readable by a machine, tangibly embodying a program of instructions executable by the machine for performing operations, said operations comprising steps of any one of the above methods.

In another non-limiting, exemplary embodiment, an apparatus comprising: at least one processor configured to define a variable $B = SF_{max}/SF_{min}$, where $SF_{max}$ is a maximum desired spreading factor and $SF_{min}$ is a minimum desired spreading factor; to form B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix; to form a modulation matrix M of dimension B×B such that $MM^T = BI_B$, where $I_B$ is a B×B identity matrix; to form an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$; and to select a row of the OVSF code matrix C' to use as a pseudo-noise (PN) code; and a transceiver configured to transmit or receive a signal using the selected PN code.

An apparatus as above, where $SF_{max}$ and $SF_{min}$ are measured in chips per modulated symbol. An apparatus as in any above, where the at least one processor is further configured to perform at least one constrained column-wise permutation on the OVSF code matrix C' prior to selection of the row, where the constraint on the at least one constrained column-wise permutation is designed to preserve OVSF properties of the permuted code matrix C. An apparatus as in any above, where the B unique base matrices $G_k$ comprise Hadamard matrices. An apparatus as in any above, where the apparatus comprises a unit within a multi-rate code division multiple access (CDMA) wireless communication system. An apparatus as in any above, where the apparatus comprises a fixed subscriber unit or a mobile subscriber unit. An apparatus as in any above, where the apparatus comprises a subscriber unit. An apparatus as in any above, wherein the apparatus comprises a base station.

In another non-limiting, exemplary embodiment, an apparatus comprising: means for defining a variable $B = SF_{max}/SF_{min}$, where $SF_{max}$ is a maximum desired spreading factor and $SF_{min}$ is a minimum desired spreading factor; forming B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix; means for forming a modulation matrix M of dimension B×B such that $MM^T = BI_B$, where $I_B$ is a B×B identity matrix; means for forming an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$; means for selecting a row of the OVSF code matrix C' to use as a pseudo-noise (PN) code; and one of means for spreading or means for despreading a signal using the selected PN code. An apparatus as in the previous, further comprising one or more additional aspects of the exemplary embodiments of the invention as further described herein.

Any use of the terms "connected," "coupled" or variants thereof should be interpreted to indicate any such connection or coupling, direct or indirect, between the identified elements. As a non-limiting example, one or more intermediate elements may be present between the "coupled" elements. The connection or coupling between the identified elements may be, as non-limiting examples, physical, electrical, magnetic, logical or any suitable combination thereof in accordance with the described exemplary embodiments. As non-limiting examples, the connection or coupling may comprise one or more printed electrical connections, wires, cables, mediums or any suitable combination thereof.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications will still fall within the scope of the teachings of the exemplary embodiments of the invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
defining a variable $B=SF_{max}/SF_{min}$, where $SF_{max}$ is a maximum desired spreading factor and $SF_{min}$ is a minimum desired spreading factor, where $SF_{max}$ and $SF_{min}$ are integer values;
forming B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix;
forming a modulation matrix M of dimension B×B such that $MM^T = BI_B$, where $I_B$ is a B×B identity matrix;
forming an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$, where i, j and k are integer values;
selecting a row of the OVSF code matrix C' to use as a pseudo-noise (PN) code; and
one of spreading or despreading a signal using the selected PN code, where the steps of defining, forming the B unique base matrices, forming the modulation matrix M, forming the OVSF code matrix C', selecting and one of spreading or despreading are performed by at least one processor.

2. The method as in claim 1, where $SF_{max}$ and $SF_{min}$ are measured in chips per modulated symbol.

3. The method as in claim 1, further comprising: performing at least one constrained column-wise permutation on the OVSF code matrix C' prior to selection of the row, where the constraint on the at least one constrained column-wise permutation is designed to preserve OVSF properties of the permuted code matrix C'.

4. The method as in claim 1, where the B unique base matrices $G_k$ comprise Hadamard matrices.

5. The method as in claim 1, where the method is implemented within a multi-rate code division multiple access (CDMA) wireless communication system.

6. The method as in claim 5, wherein the multi-rate CDMA wireless communication system comprises at least one fixed subscriber unit or at least one mobile subscriber unit.

7. An apparatus comprising:
at least one processor configured to define a variable $B=SF_{max}/SF_{min}$, where $SF_{max}$ is a maximum desired spreading factor and $SF_{min}$ is a minimum desired spreading factor and where $SF_{max}$ and $SF_{min}$ are integer values; to form B unique base matrices $G_k$ of dimension $SF_{min} \times SF_{min}$, where $G_i G_i^T = SF_{min} I_{min}$ $\forall i$, where T denotes a matrix transpose and $I_{min}$ is an $SF_{min} \times SF_{min}$ identity matrix; to form a modulation matrix M of dimension B×B such that $MM^T = BI_B$, where $I_B$ is a B×B identity matrix; to form an $SF_{max} \times SF_{max}$ orthogonal variable spread factor (OVSF) code matrix C' as:

$$C' = \begin{bmatrix} M_{1,1} \cdot G_1 & M_{1,2} \cdot G_2 & \ldots & M_{1,B} \cdot G_B \\ M_{2,1} \cdot G_1 & M_{2,2} \cdot G_2 & \ldots & M_{2,B} \cdot G_B \\ \vdots & \vdots & \ddots & \vdots \\ M_{B,1} \cdot G_1 & M_{B,2} \cdot G_2 & \ldots & M_{B,B} \cdot G_B \end{bmatrix},$$

where $M_{i,j}$ is a scalar from the i-th row and j-th column of the modulation matrix M, $G_1 \ldots G_B$ is the k-th base matrix $G_k$ and $M_{i,j} \cdot G_k$ denotes the multiplication of the elements of $G_k$ by the scalar $M_{i,j}$, where i, j and k are integer values; and to select a row of the OVSF code matrix C' to use as a pseudo-noise (PN) code; and
a transceiver configured to transmit or receive a signal using the selected PN code.

8. The apparatus as in claim 7, where $SF_{max}$ and $SF_{min}$ are measured in chips per modulated symbol.

9. The apparatus as in claim 7, where the at least one processor is further configured to perform at least one constrained column-wise permutation on the OVSF code matrix C' prior to selection of the row, where the constraint on the at least one constrained column-wise permutation is designed to preserve OVSF properties of the permuted code matrix C'.

10. The apparatus as in claim 7, where the B unique base matrices $G_k$ comprise Hadamard matrices.

11. The apparatus as in claim 7, where the apparatus comprises a unit within a multi-rate code division multiple access (CDMA) wireless communication system.

12. The apparatus as in claim 11, where the apparatus comprises a fixed subscriber unit or a mobile subscriber unit.

13. The apparatus as in claim 7, where the apparatus comprises a subscriber unit.

14. The apparatus as in claim 7, wherein the apparatus comprises a base station.

* * * * *